United States Patent
Venturi

(10) Patent No.: US 8,894,528 B2
(45) Date of Patent: Nov. 25, 2014

(54) POWERTRAIN WITH DOUBLE EPICYCLIC GEAR TRAIN FOR A HYBRID TYPE MOTOR VEHICLE

(75) Inventor: Stéphane Venturi, Roiffieux (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 13/809,174

(22) PCT Filed: Jul. 13, 2011

(86) PCT No.: PCT/FR2011/000418
§ 371 (c)(1),
(2), (4) Date: Mar. 14, 2013

(87) PCT Pub. No.: WO2012/007661
PCT Pub. Date: Jan. 19, 2012

(65) Prior Publication Data
US 2013/0172146 A1 Jul. 4, 2013

(30) Foreign Application Priority Data

Jul. 16, 2010 (FR) .................................... 10 03002
May 24, 2011 (FR) .................................... 11 01595

(51) Int. Cl.
| | | |
|---|---|---|
| *F16H 3/72* | (2006.01) | |
| *F16H 37/06* | (2006.01) | |
| *B60W 20/00* | (2006.01) | |
| *B60K 6/365* | (2007.10) | |
| *B60K 6/383* | (2007.10) | |
| *B60K 6/48* | (2007.10) | |

(52) U.S. Cl.
CPC ............... *B60W 20/30* (2013.01); *B60K 6/365* (2013.01); *B60K 6/383* (2013.01); *B60K 6/48* (2013.01); *Y02T 10/6221* (2013.01); *Y10S 903/902* (2013.01)
USPC .............................................. 475/8; 903/902

(58) Field of Classification Search
USPC ......... 475/1, 4, 5, 8, 221, 225, 282, 283, 296, 475/297, 312, 317, 318, 330
See application file for complete search history.

(56) References Cited

U.S. PATENT DOCUMENTS

| 5,558,175 A | * | 9/1996 | Sherman .................... 180/65.25 |
| 5,562,565 A | * | 10/1996 | Moroto et al. .................... 477/3 |
| 6,344,008 B1 | | 2/2002 | Nagano et al. |

(Continued)

FOREIGN PATENT DOCUMENTS

| DE | 10 2009 044 491 A1 | 5/2010 |
| FR | 2 955 165 | 7/2011 |
| WO | WO 2006/038224 A2 | 4/2006 |

*Primary Examiner* — Justin Holmes
(74) *Attorney, Agent, or Firm* — Antonelli, Terry, Stout & Kraus, LLP.

(57) ABSTRACT

The present invention is a powertrain for a hybrid type motor vehicle comprising an electric machine (22), a thermal engine (10), a speed variation device (14) including an engine epicyclic gear train (26) with a sun gear (36) and a crown (50), each connected to shaft (12) of thermal engine (10) by a controlled clutch (28, 30) and to a fixed portion (48) of the vehicle by a one-way coupling (32, 34), and a motion transmission track (120, 122) for motion transmission to a drive axle (16). The powertrain comprises another epicyclic gear train (96) connecting engine epicyclic gear train (26) to said motion transmission track (120, 122).

35 Claims, 9 Drawing Sheets

(56) References Cited

U.S. PATENT DOCUMENTS

| | | |
|---|---|---|
| 6,592,484 B1 | 7/2003 | Tsai et al. |
| 7,115,065 B2 * | 10/2006 | Tabata et al. ............ 477/3 |
| 7,347,797 B2 * | 3/2008 | Sowul et al. ............ 475/5 |
| 2002/0061802 A1 * | 5/2002 | Chung ............ 477/3 |
| 2004/0043859 A1 * | 3/2004 | Yurgil et al. ............ 475/318 |
| 2007/0275808 A1 | 11/2007 | Iwanaka et al. |
| 2009/0062997 A1 * | 3/2009 | Iwase et al. ............ 701/68 |
| 2011/0172044 A1 | 7/2011 | Venturi |

* cited by examiner

POWERTRAIN WITH DOUBLE EPICYCLIC GEAR TRAIN FOR A HYBRID TYPE MOTOR VEHICLE

BACKGROUND OF THE INVENTION

1. Field of the Invention

The present invention relates to a powertrain for driving a hybrid type motor vehicle comprising a powertrain that uses, alone or in combination, as a traction/propulsion drive, an internal-combustion thermal engine with a speed variation device, and a rotary electric machine connected to an electric source, such as one or more batteries.

This combination has the advantage of optimizing the performances of the vehicle, which notably reduces the discharge of emissions to the atmosphere and decreases the fuel consumption.

2. Description of the Prior Art

Thus, when a vehicle of the above type is to be driven with a high torque over a wide speed range while limiting exhaust gas and noise generation, as in an urban site, the electric machine is preferably used for driving this vehicle.

On the other hand, the thermal engine is used for driving this vehicle for uses where a high driving power and a wide operating range are required.

A hybrid vehicle has also been proposed, notably in U.S. Pat. No. 6,344,008, wherein part of the speed variation device comprises an epicyclic gear train with a crown, a sun gear and a planet gear carrier for driving the vehicle through its drive axle.

In this type of epicyclic gear train, it is difficult to control the direction of rotation of the various elements, which can go against the desired direction. This leads to parasitic stresses and load torques that interfere with the smooth running of the epicyclic gear.

As better described in French Patent Publication No. 2 955 165, corresponding to US 2011/0172044 A1, filed by the Assignee, the speed variation device is improved by configuring the epicyclic gear train with one-way couplings and controlled clutches, and by arranging a variable speed transmission device between the electric machine and the axle of the vehicle.

With a view to continuous improvement, the Assignee has further perfected this variable speed transmission device by simplifying it while making it possible for the vehicle to be driven by the electric machine with different gear ratios.

SUMMARY OF THE INVENTION

The invention relates to a powertrain for a hybrid type motor vehicle comprising an electric machine, a thermal engine, a speed variation device including an epicyclic gear train with a sun gear and a crown, each connected to a shaft of the thermal engine by a controlled clutch and to a fixed portion of the vehicle by a one-way coupling, and a motive transmission track for motion transmission to a drive axle, comprising another epicyclic gear train connecting the epicyclic gear train to the motive transmission track.

The powertrain can comprise at least one controlled coupling carried by at least one of the elements of the additional epicyclic gear train.

The powertrain can comprise at least one controlled coupling carried by at least one of the elements of the engine epicyclic gear train.

The controlled coupling can be carried by the crown of the engine epicyclic gear train.

The controlled coupling can comprise an actuator and at least one coupling surface for coupling with the actuator.

The coupling surface can be carried by a fixed portion of the powertrain.

The coupling surface can be carried by one of the elements of the other epicyclic gear train.

The coupling surface can be carried by the planet gear carrier of the other epicyclic gear train.

The actuator can be carried by one of the constituent elements of the other epicyclic gear train.

The actuator can be carried by the crown of the other epicyclic gear train.

The actuator can be carried by the sun gear of the other epicyclic gear train.

The machine epicyclic gear train and the other epicyclic gear train can be arranged coaxially to one another.

Advantageously, the powertrain can comprise a rotating motion transmission track parallel to the engine shaft for connection between the engine shaft and the crown of one of the epicyclic gear trains.

The rotating motion transmission track can comprise a transmission shaft carrying a rotational linking means for connection with the shaft and the crown.

The rotating motion transmission track can comprise two half shafts connected to one another by a one-way coupling.

Preferably, the one-way coupling can comprise a free wheel.

The linking means for connection with the shaft can comprise a gear.

The linking means for connection with the crown can comprise a toothed wheel cooperating with external teeth carried by a strip of the crown.

The transmission shaft can be arranged parallel to the engine shaft.

The transmission shaft can be supported by bearings carried by a fixed portion of the powertrain.

BRIEF DESCRIPTION OF THE DRAWINGS

Other features and advantages of the invention will be clear from reading the description hereafter, given by way of non limitative example, with reference to the accompanying figures wherein.

DETAILED DESCRIPTION OF THE INVENTION

Figure 1:
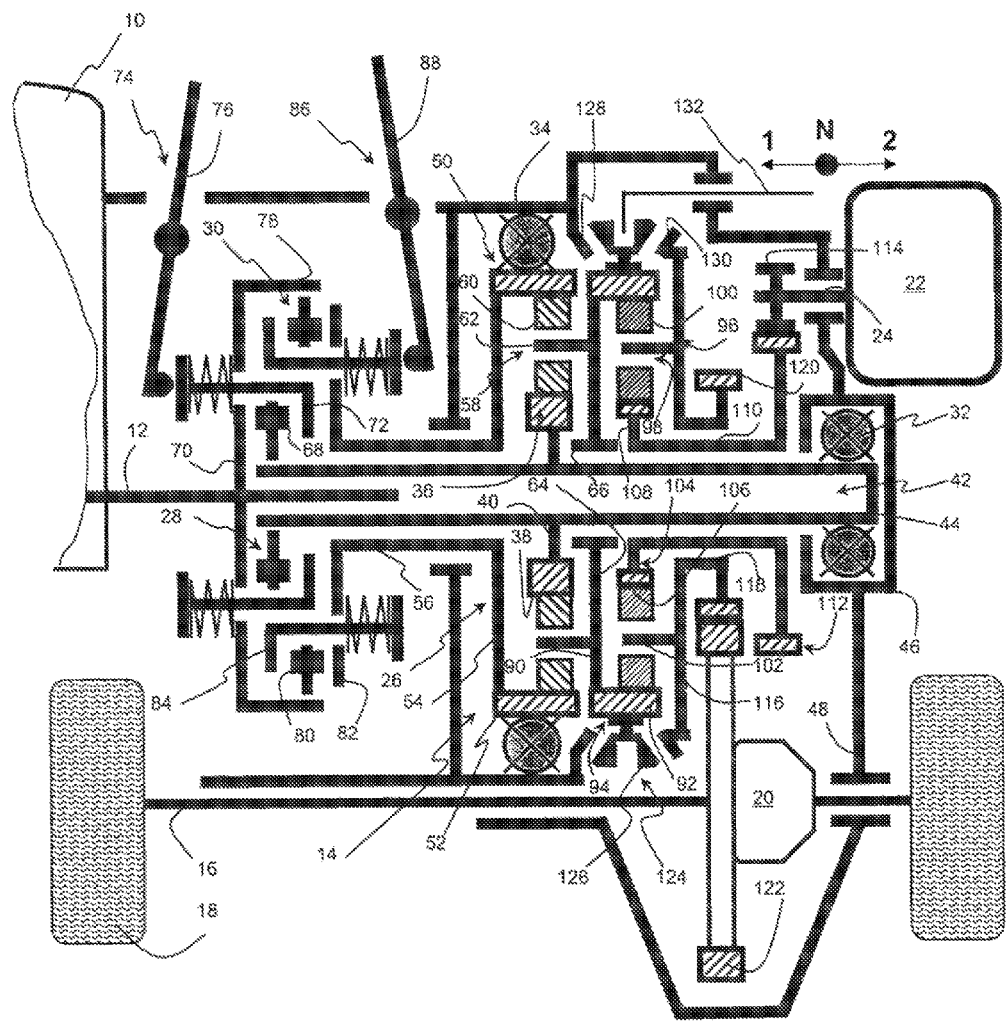
FIG. 1 is a diagram showing a powertrain according to the invention applied to a hybrid vehicle drive system.

In FIG. 1, the powertrain comprises a thermal engine 10, notably an internal-combustion engine, with an engine shaft 12 from the crankshaft of THE engine, a speed variation device 14 and a drive axle 16 allowing driving wheels 18 of the vehicle, advantageously by means of a differential 20.

As explained below, engine shaft 12 also fulfils the function of a receiving shaft but, for simplification reasons, this shaft is only referred to as engine shaft so as to be able to distinguish it from the other shafts of the transmission device.

The powertrain also comprises an electric machine 22 with a rotor 24 that can operate as an electric motor for driving the vehicle or as an electric power generator, more particularly as an alternator for charging the batteries (not shown).

Speed variation device 14 comprises a main epicyclic gear train 26, referred to as thermal engine epicyclic gear train, with two controlled clutches 28 and 30 and two automatic one-way couplings, such as free wheels 32 and 34.

More precisely, engine epicyclic gear train 26 comprises a sun gear 36 with an externally toothed strip 38 and carried by a flange 40. This flange is fixedly mounted on a hollow shaft 42, referred to as sun gear shaft, which ends engine shaft 12 while being free in rotation but fixed in translation with respect thereto. The free end 44 of shaft 42 rests on a bearing 46 carried by a fixed portion 48 of the vehicle powertrain through one-way coupling 32, referred to as sun gear free wheel.

The train 26 also comprises a crown 50 with an internally toothed ring 52 arranged concentrically to the sun gear, and a shell 54 connected to a hollow shaft 56, referred to as crown shaft, surrounding hollow shaft 42 of the sun gear while remaining free in rotation, but fixed in translation with respect thereto. This crown is externally connected to fixed portion 48 of the vehicle powertrain by one-way coupling 34, referred to as crown free wheel.

Of course, the two free wheels 32 and 34 are arranged in such a way that crown 50 and sun gear 36 can rotate only in the same direction, and preferably in the same direction as engine shaft 12.

Finally, the engine epicyclic gear train 26 comprises a planet gear carrier 58 with advantageously three planet gears 60 in the form of externally toothed wheels, arranged in the same angular interval with respect to one another (120° here) and meshing with the crown and the sun gear.

Ring 52 of the crown, strip 38 of the sun gear and planet gears 60 are therefore arranged in the same plane, in a vertical plane of FIG. 1.

The planet gears are carried each by a horizontal pin 62 while being free in rotation, but fixed in translation thereon. These planet gear pins are connected to a vertical wall 64 linked to a tubular shaft 66, referred to as planet gear carrier shaft, surrounding sun gear shaft 42 while rotating freely thereon.

The free ends of the sun gear and crown shafts each carry a controlled coupling 28 and 30, which is preferably a friction clutch.

The clutch 28, referred to as sun gear clutch, comprises a friction disk 68 carried fixedly in rotation, but free in translation on sun gear shaft 42. This friction disk is intended to be squeezed between a reaction plate 70, mounted fixed in translation and in rotation on engine shaft 12, and a pressure plate 72, mobile in translation with respect to the pressure plate while being fixed in rotation therewith. The axial displacement of this pressure plate is controlled by a disengagement actuator 74, in the form of a lever 76 pivoting on a fixed point 78 of the powertrain.

Pressure plate 70 is extended, over the periphery thereof, by a horizontal wall 78 that carries, fixed in rotation and free in axial translation, another friction disk 80, coaxial to friction disk 68 and which belongs to the other clutch 30, referred to as crown clutch.

This disk can be squeezed between a reaction plate 82, mounted fixed in translation and in rotation on the free end of crown shaft 56, and a pressure plate 84 mobile in axial translation under the action of another disengagement actuator 86. As mentioned above, this actuator comes in the form of a lever 88 pivoting on a fixed point of the powertrain.

As better illustrated in FIG. 1, vertical wall 64 of planet gear carrier 58 extends over the periphery thereof by a flat vertical ring 90 from which an internally toothed horizontal strip 92 is arranged. This ring and this strip thus form a crown 94 of another, additional epicyclic gear train 96, referred to as machine epicyclic gear train in the rest of the description.

The machine epicyclic gear train 96 is arranged coaxially to engine epicyclic gear train 26 and surrounding sun gear shaft 42 and comprises a planet gear carrier 98 with advantageously three planet gears 100 in the form of externally toothed wheels, carried by planet gear pins 102, arranged in the same angular interval with respect to one another (120° here) and meshing with the teeth of strip 92 of crown 94.

These planet gears also mesh with a sun gear 104 comprising an externally toothed strip 106 and are carried by a flange 108. The flange 108 is fixedly mounted on a tubular shaft 110, referred to as additional sun gear shaft, which freely is rotational but is fixed in translation sun gear shaft 42 of engine epicyclic gear train 26. The free end of tubular shaft 110 carries fixedly a toothed wheel 112 that cooperates with another toothed wheel 114 carried fixedly by rotor 24 of the electric machine.

Of course, as for thermal engine epicyclic gear train 26, strip 92 of crown 94, toothed strip 106 of the sun gear and planet gears 100 are arranged in the same plane, which is a vertical plane of FIG. 1.

Planet gear pins 102 are carried by a plate 116 that belongs to the planet gear carrier, comprising a tubular bearing 118 surrounding freely for rotation but fixedly for translation tubular sun gear shaft 110.

The bearing 118 carries a fixed toothed wheel 120 that cooperates with another toothed wheel 122 linked to drive axle 16. This assembly of two toothed wheels thus forms a motion transmission track between machine epicyclic gear train 96 and axle 16.

Epicyclic drive train 96 also carries a controlled coupling 124 allowing crown 94 to be connected either to plate 116 or to fixed portion 48 of the powertrain.

Advantageously, this coupling comprises a claw actuator 126 with two meshing positions 1 and 2 and a neutral position N. Actuator 126 is carried fixedly for rotation by the outer wall of strip 92 of crown 94 while being mobile for axial translation thereon. This actuator cooperates either with a fixed coupling surface 128 carried by a fixed portion of the powertrain, or with another coupling surface 130 carried by the peripheral end of plate 116.

The actuator is therefore controlled by a control means 132 allowing coupling thereof with fixed portion 128 of the powertrain (position 1), with plate 116 (position 2) or bringing it into a neutral position N without being linked to any of the two coupling surfaces.

The various configurations of the powertrain are now described according to the traction/propulsion mode used and/or to the operation of the thermal engine and the electric machine.

During operation of the vehicle in the electric running mode where only electric machine 22 is used, notably as the motive machine of the vehicle, both clutches 28 and 30 are inactive, actuator 126 is in the neutral position N and does not mesh with another of the two coupling surfaces 128 or 130.

As soon as electric machine 22 is electrically fed, its rotor 24 is driven into rotation to work as an electric motor. This rotating motion is transmitted to toothed wheel 112 through toothed wheel 114 of rotor 24.

From this configuration, actuator 126 is controlled in one of positions 1 or 2 to drive axle 16 of the vehicle in rotation.

In position 1, the actuator is in mesh with coupling surface 128 of the fixed portion by immobilizing rotation of crown 94 of electric machine epicyclic gear train 96. The rotating motion of toothed wheel 112 is therefore transmitted to sun gear 104 through sun gear shaft 110. This rotation is then transmitted to planet gears 100 that, considering the immobilization in rotation of crown 94, mesh therewith while driving planet gear carrier 98 in rotation. This rotating motion is then transmitted to toothed wheel 120 of the motion transmission track through tubular bearing 118. The rotation of this toothed wheel, which cooperates through meshing with axle toothed wheel 112, is then transmitted to axle 16 to drive wheels 18 of the vehicle.

The vehicle is thus driven only through electric traction/propulsion with a short gear ratio, in forward as well as reverse gear.

Furthermore, in the case of deceleration of the vehicle, electric energy can be recovered, electric machine 22 is driven in rotation under the effect of the rotation of the wheels of the vehicle and of toothed wheels 122, 120, 112, 114 of sun gear 104 and of planet gears 100. This allows the machine to be operated as an electric generator, notably for recharging the batteries.

If claw actuator 126 meshes with coupling surface 130 of plate 116 (position 2), crown 94 is linked thereto in rotation. The rotation of sun gear 104 is transmitted to planet gears 110, themselves transmitting to crown 94. Due to the link with plate 116, the rotation of this crown is retransmitted to toothed wheel 120 that cooperates with axle toothed wheel 122 while driving the wheels of the vehicle in rotation.

In this configuration, sun gear shaft 110, bearing 118 of plate 116 and bearing 66 of planet gear carrier 58 are linked to crown 94 to rotate at the same speed.

In order to be able to fulfil the same function, and without departing from the scope of the invention, it is also possible to mesh two of the three shafts of machine epicyclic gear train 96, either by coupling crown 94 and planet gear carrier 98, or by coupling crown 94 and sun gear 104, or by coupling planet gear carrier 98 and sun gear 104.

It should be noted that the rotation of crown 94 is entirely free because the elements of engine epicyclic gear train 26 linked thereto by planet gear pins 62 are free in rotation while clutches 28 and 30 are inactive.

The vehicle is therefore driven by electric traction/propulsion over a long gear ratio, with possible energy recovery upon vehicle deceleration in forward gear.

If actuator 126 is in neutral position N, traction/propulsion of the vehicle in forward gear is achieved with the short gear ratio since immobilization of crown 94 is obtained through rotation standstill of crown 50 and sun gear 36 of engine epicyclic gear train 26 through the agency of free wheels 34 and 32.

For starting the thermal engine when the vehicle is stationary with the configuration where actuator 126 is in neutral position N, the parking brake (any vehicle is usually provided with) is put on, with machine epicyclic gear train 96 locked in rotation and clutches 28 and 30 in active position.

It is thus possible, on the one hand, to start thermal engine 10 with electric machine 22, which is used as an electric starter, and, on the other hand, to recharge the batteries using electric machine 22 as a generator that is, in this case, driven by the thermal engine.

To start engine 10, machine 22 is supplied by the batteries, which causes rotor 24 to be driven in rotation. This rotation drives sun gear 104 by means of toothed wheels 114 and 112, which in turn drives crown 94 through planet gears 100 when the two clutches 28 and 30 are engaged, crown 94 drives all of the elements of engine epicyclic gear train 26 through the planet gear carrier 58, which drives shaft 12 of thermal engine 10.

This therefore allows the thermal engine to be started through the rotation of its shaft 12 by the electric machine 22.

Of course, as soon as the thermal engine is started, one and/or the other of disengagement actuators 74 and/or 86 can be controlled to uncouple thermal engine shaft 12 from machine 22 by disengaging clutch 28 and/or 30.

To start the thermal engine while the vehicle is moving under the effect of electric machine 22, clutches 28 and 30 are engaged. Crown 94 then drives all of the elements of epicyclic gear train 26 by means of planet gear carrier 58, which drives shaft 12 of the thermal engine.

This configuration allows the vehicle to run in forward gear while leaving the possibility for the thermal engine 10 to remain in operation, notably for driving vehicle auxiliaries (power steering pump, air conditioning compressor, etc.).

Thus, the electric machine 22 fulfils a dual function, which on the one hand is traction/propulsion of the vehicle and, on the other hand, is starting of the thermal engine when the vehicle is moving.

The other configurations are described now to illustrate the traction/propulsion of the vehicle by thermal engine 10 with different gear ratios and the various possible ways of using electric machine 22 as an electric generator.

In these configurations, actuator 126 is either in neutral position N or in position 2, and clutches 28 and 30 are either both engaged or one or the other is engaged.

In the configuration where both clutches 28 and 30 are engaged, the rotation of shaft 12 of thermal engine 10 drives in rotation shaft 56 with crown 50, shaft 42 with sun gear 36 and consequently planet gear carrier 58. This rotation of the planet gear carrier is then transmitted through wall 64 to crown 94 of the epicyclic gear train of the machine.

When claw actuator 126 is in position 2, sun gear shaft 110, bearing 118 of plate 116 and bearing 66 of planet gear carrier 58 linked to crown 94 all rotate at the same speed.

Planet gear carrier 98 of the machine epicyclic gear train drives axle 16 by means of wheels 120 and 122, while sun gear 104 drives electric machine 22 in rotation by means of wheels 112 and 114.

In this thermal traction mode, electric machine 22 can be used either in motor operation mode with the combined power of the electric machine and of the thermal engine transmitted to axle 16 or in generator operation mode for supplying the batteries or any electric auxiliary load of the vehicle.

In this case, the power of the thermal engine is used, on the one hand, for the vehicle traction and, on the other hand, for driving rotor 24 of this machine in order to use the latter as a generator.

One or the other of the clutches can then be disengaged to obtain other gear ratios.

For the disengaged position of clutch 28 and active position of clutch 30, the rotation of shaft 12 of thermal engine 10 drives in rotation shaft 56 with crown 50 that drives in rotation planet gears 60 and then planet gear carrier 58. This rotation of the planet gear carrier is then transmitted through wall 64 to crown 94 of machine epicyclic gear train 96.

Thus, when claw actuator 126 is in position 2, the rotating motion of crown 94 is transmitted to plate 116, then to toothed wheel 120 by bearing 118. This wheel drives axle 16 through the wheel 122, while sun gear 104 drives electric machine 22 in rotation by means of wheels 112 and 114.

When claw actuator 126 is in neutral position N, the torque transmitted by shaft 12 of the thermal engine to crown 94 is transferred to planet gear carrier 98 through the planet gears 100, using the reaction of sun gear 104. Planet gear carrier 98 then drives axle 16 by means of wheels 120 and 122, while sun gear 104 drives electric machine 22 in rotation by means of wheels 112 and 114.

For the disengaged position of clutch 30 and the active position of clutch 28, the rotation of shaft 12 of thermal engine 10 drives in rotation sun gear shaft 42 with sun gear 36. The rotation of the sun gear drives in rotation planet gears 60 and then planet gear carrier 58. This rotation of the planet gear carrier is then transmitted through wall 64 to crown 94 of machine epicyclic gear train 96.

From this configuration, the path followed by the motion transmission is the same as the one described in connection with the disengaged position of clutch 30 for positions N or 2 of claw actuator 126.

In deceleration phase, maximum energy recovery is possible when at least one of clutches 28 or 30 is open since, in this case, the presence of free wheels 32 and 34 does not allow torque transmission from axle 16 to thermal engine 10.

When both clutches 28 and 30 are engaged, the power coming from the axle is partly absorbed by the thermal engine (engine brake) and partly absorbed by machine 22 (energy recovery).

This configuration also allows the vehicle to be used in thermal traction mode only, if the batteries are empty, since using machine 22 as a reaction means allows it to be used as an electric generator. Thus, the power of the thermal engine is used partly for traction of the vehicle and partly for charging the battery.

Using machine 22 as a reaction means also allows obtaining pull-away of the vehicle (vehicle start from its zero speed) when clutches 28 and 30 are already engaged.

Figure 2:
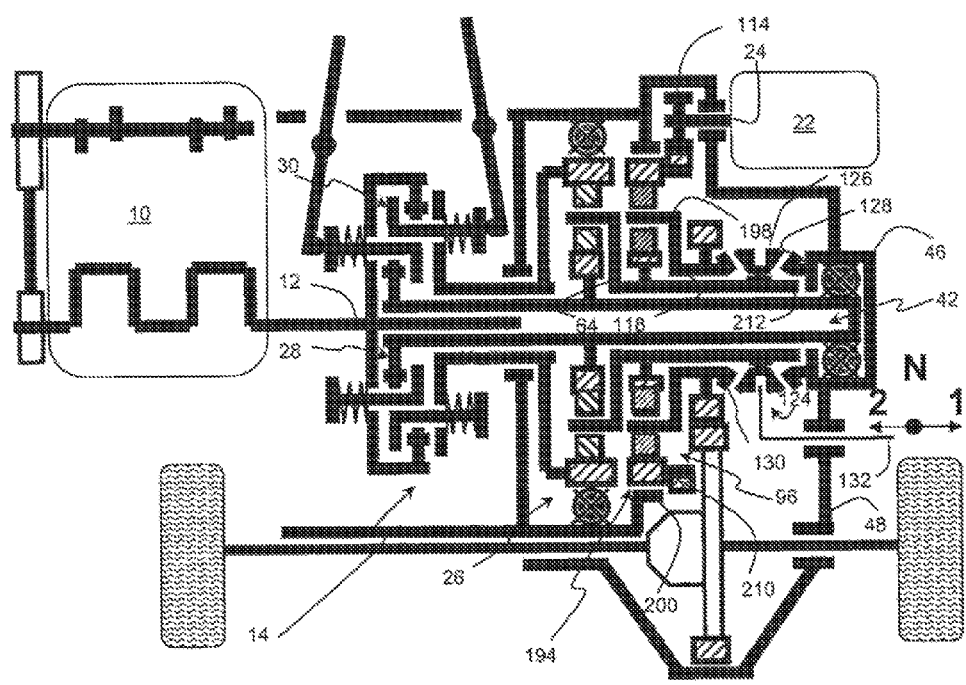
FIGS. 2 to 9 illustrate other variants of the powertrain of FIG. 1.

The embodiment of FIG. 2 differs from FIG. 1 in that crown 194 of electric machine epicyclic gear train 96 is mounted free in rotation on a bearing 200 provided on fixed portion 48 of the vehicle.

This crown is fixedly linked to an externally toothed strip 210 arranged coaxially to this crown and cooperating with toothed wheel 114 of rotor 24 of electric machine 22.

This embodiment also differs in that planet gear carrier 198 of epicyclic gear train 96 carries a coupling surface 130 provided at the free end of bearing 118. This surface belongs to a controlled coupling 124 comprising, as already described, a claw actuator 126 with two active positions 1 and 2 and a neutral position N under the action of a control means 132. This actuator can cooperate with coupling surface 130 of the planet gear carrier or with another coupling surface 128 carried by a fixed portion 48 of the powertrain, here at the level of bearing 46 receiving hollow shaft 42. The claw actuator is mounted on a tubular bearing 212 carrying vertical wall 64 of planet gear carrier 58 and flange 108 of sun gear 104.

The operating mode of this embodiment is identical to that of FIG. 1 regarding the electric as well as thermal traction/propulsion.

Figure 3:
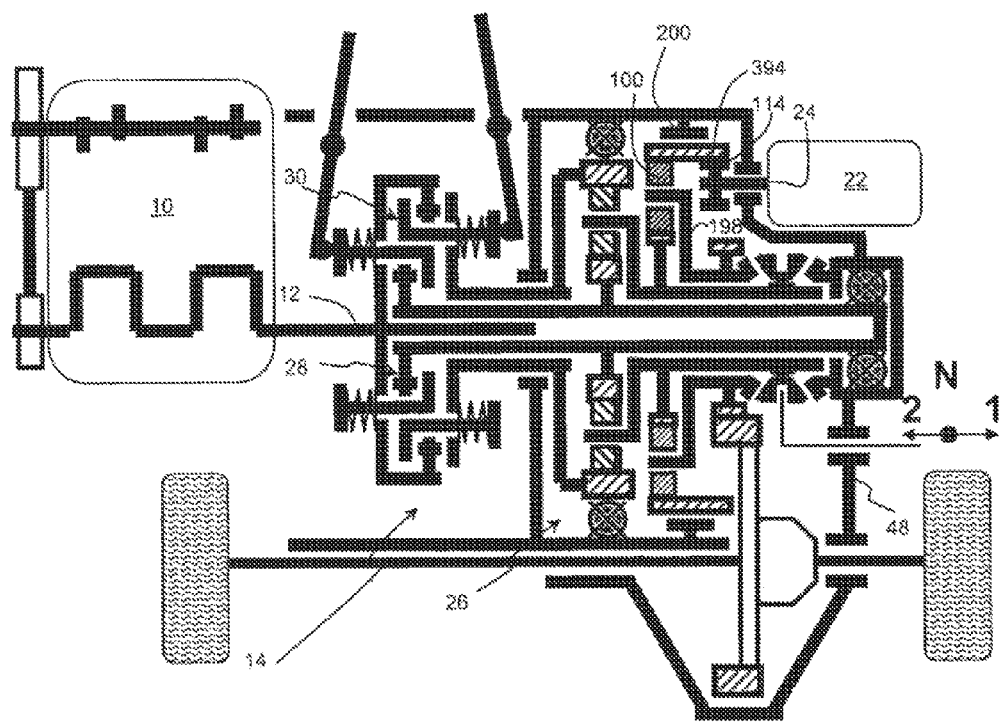

In the embodiment of FIG. 3, which is very close to that of FIG. 2, crown 94 and strip 210 of FIG. 2 are grouped into a single assembly in the form of an internally toothed crown 394. The length of this crown is greater than that of toothed crown of FIG. 2 and it is housed, free in rotation, in a bearing 200 carried by fixed portion 48 of the powertrain. The internally toothed strip of crown 394 is thus intended to receive toothed wheel 114 of electric machine 22, as well as planet gears 100 of planet gear carrier 198.

Similarly, the traction/propulsion operating mode of this embodiment is identical to that of FIG. 1.

Figure 4:
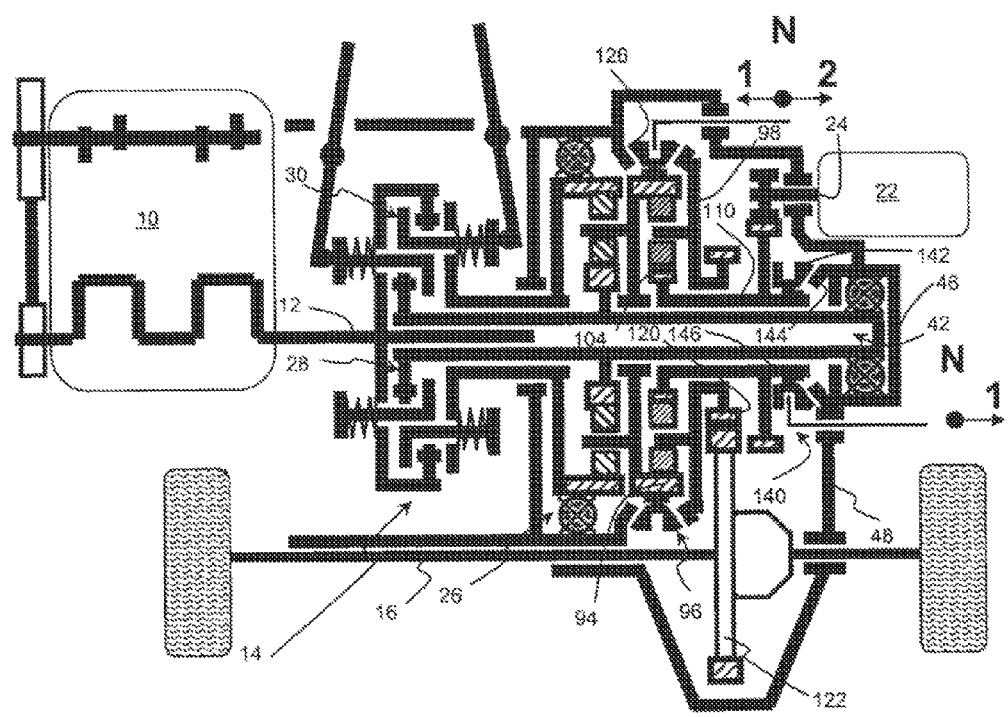

The embodiment of FIG. 4 differs from that of FIG. 1 in that it comprises an additional controlled coupling 140. This coupling involves an axial-displacement actuator 142 with a single meshing position 1 and a neutral position N, which can cooperate with a fixed coupling surface 144 carried by fixed portion 48 of the powertrain.

As can be seen in FIG. 4, actuator 142 is arranged on an extension 146 of sun gear shaft 110 and coupling surface 144 is arranged opposite this actuator, more particularly on bearing 46 receiving end 44 of shaft 42.

This additional coupling allows obtaining traction of the vehicle by the thermal engine alone over a short gear ratio, while actuator 126 carried by the epicyclic gear train in the neutral position N.

During coupling between actuator 142 of additional coupling 140 and surface 144, sun gear 104 is locked in rotation. Therefore, the power transmitted by the thermal engine passes through crown 94 and planet gear carrier 98 in order to be transmitted to axle 16 via toothed wheels 120 and 122.

Except for the operation with additional coupling 140, the operation of the powertrain of this embodiment is identical to that of FIG. 1.

Figure 5:
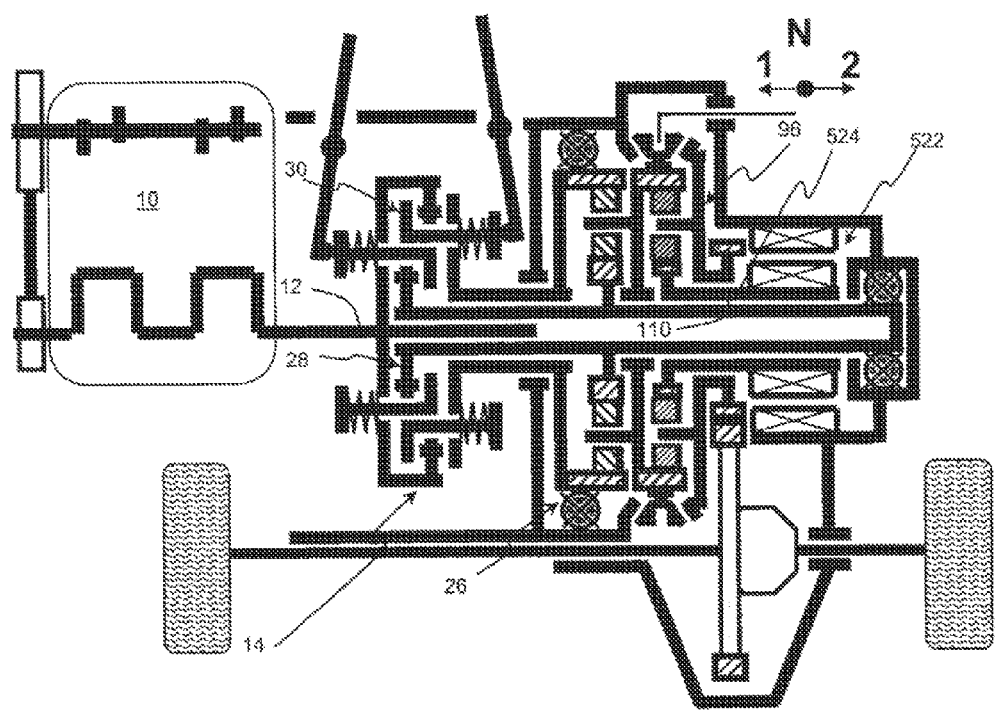

FIG. 5 differs from FIG. 1 in that rotor 524 of electric machine 522 is a sun gear shaft 110 with toothed wheels 112 and 114 having been removed.

Also, the operating mode of this embodiment of the powertrain is identical to that of FIG. 1.

Figure 6:
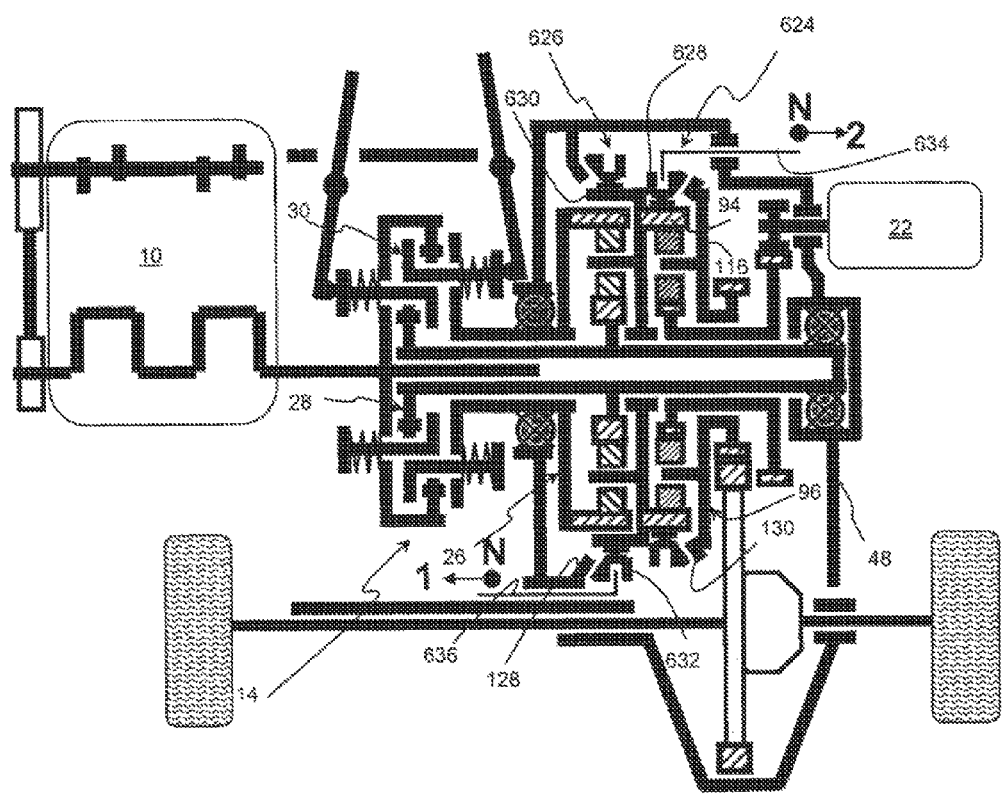

The example illustrated in FIG. 6 differs from that of FIG. 1 in that positions 1 and 2 of the actuator are obtained by two controlled couplings 624 and 626 separated from one another while being fixedly linked in rotation but free in translation on crown 94 of gear train 96.

As in FIG. 1, one of the couplings, 624, is carried by crown 94 of epicyclic gear train 96 and it allows this crown 94 to be linked to plate 116.

This coupling comprises a claw actuator 628 with two positions, a neutral position N and an active position 2 where it cooperates with coupling surface 130 carried by plate 116.

The other coupling, 626, is carried by an axial member 630 fixedly linked to crown 94 of machine epicyclic gear train 96 which allows crown 94 to be linked to fixed portion 48 of the powertrain.

This other coupling comprises a claw actuator 632 with two positions, a neutral position N and an active position 1 where it cooperates with fixed coupling surface 128 carried by fixed portion 48.

Of course, each actuator is coupled to a control means 634 and 636 enabling achieving, for actuator 628, coupling with plate 116 which is position 2 and for actuator 632, coupling with fixed portion 128 of the powertrain which is position 1 or, for both actuators, to be in neutral position N without being linked to any of the two coupling surfaces.

The operating mode of this embodiment of the other configurations is also identical to that of FIG. 1.

Figure 7:
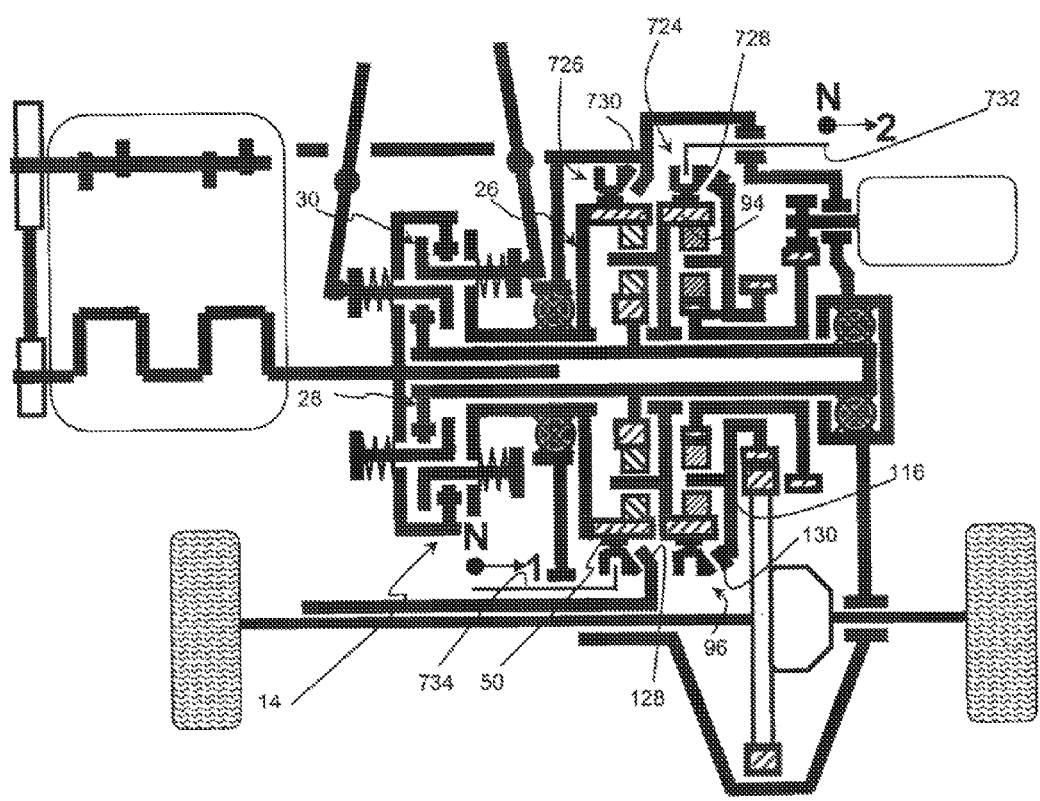

FIG. 7 differs from FIG. 6 in that controlled couplings 724, 726 are no longer both fixed in rotation with crown 94 of electric machine epicyclic gear train 96.

Only one coupling 724 is carried by crown 94 of machine epicyclic gear train 96 which allows this crown to be linked to plate 116.

This coupling comprises a claw actuator 728 with two positions which are a neutral position N and an active position 2 at which it cooperates with coupling surface 130 carried by plate 116.

The other coupling 726 is carried by crown 50 of engine epicyclic gear train 26 which allows this crown to be linked to a fixed portion 48 of the powertrain.

Coupling 726 comprises a claw actuator 730 with two positions which are a neutral position N and an active position 1 at which it cooperates with fixed coupling surface 128 carried by fixed portion 48.

As in FIG. 6, each actuator is coupled to a control means 732 and 734 enabling it to achieve, for actuator 728 coupling with plate 116 which is position 2 and for actuator 730 coupling with fixed portion 128 of the powertrain which is position 1 or, for both actuators, to be in neutral position N without being linked to any of the two coupling surfaces.

This embodiment allows, on the one hand, obtaining engine braking with the first gear ratio of speed variation device 14 and, on the other hand, to achieve energy recovery when the transmission is used in a continuous variation mode corresponding to the neutral position of actuator 126 of FIG. 1.

As for the other embodiments, this embodiment comprises essentially the same operating configurations.

Figure 8:
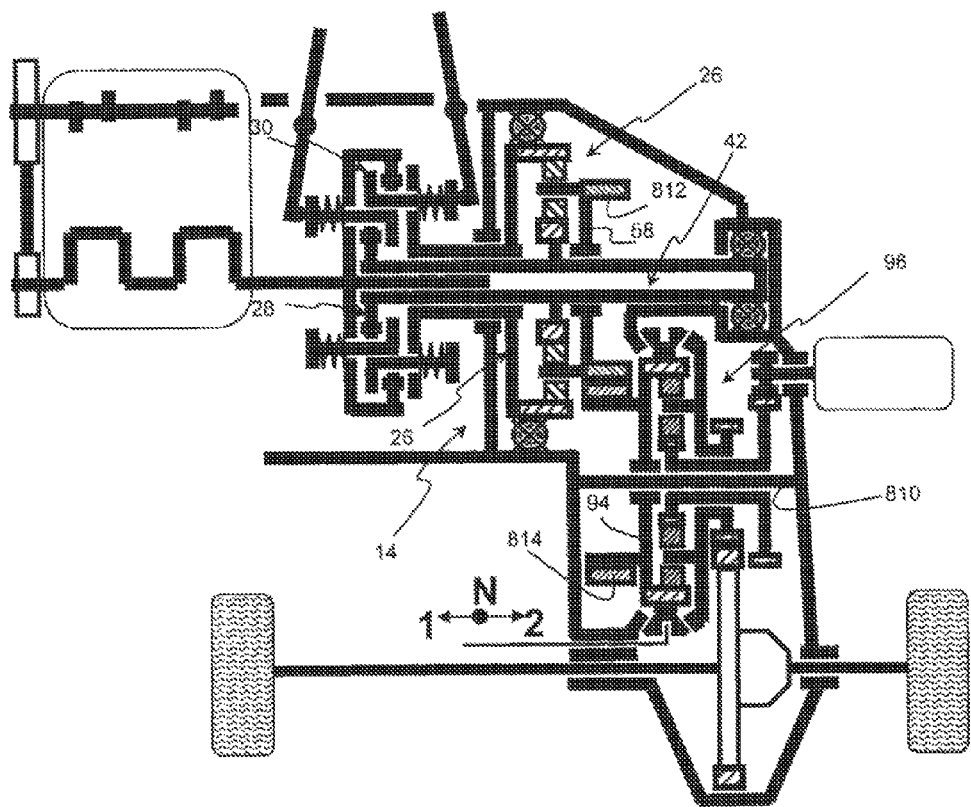

The embodiment illustrated in FIG. 8 differs from that of FIG. 1 in that machine epicyclic gear train 96 is no longer coaxial to thermal engine epicyclic gear train 26 by surrounding shaft 42.

The configuration of the assembly formed by speed variation device 14 is identical to that of FIG. 1 and epicyclic gear train 96 is arranged on a fixed shaft 810 that is substantially parallel to hollow shaft 42 described above for the engine epicyclic gear train.

The rotational link between the two gear trains is provided by the cooperation of two toothed strips 812 and 814.

One of the strips 812 is carried by planet gear carrier 58 of epicyclic gear train 26 and cooperates through meshing with the other strip 814 that is carried by crown 94 of gear train 96.

The advantage of such a layout is that it allows obtaining a rotation of axle 16 in the same direction as shaft 12 of thermal engine 10.

Also, the operating mode of this embodiment is identical to that of FIG. 1.

The configurations described above thus allow obtaining two gear ratios when the vehicle is driven by the electric motor and three gear ratios when it is driven by the thermal engine.

Figure 9:
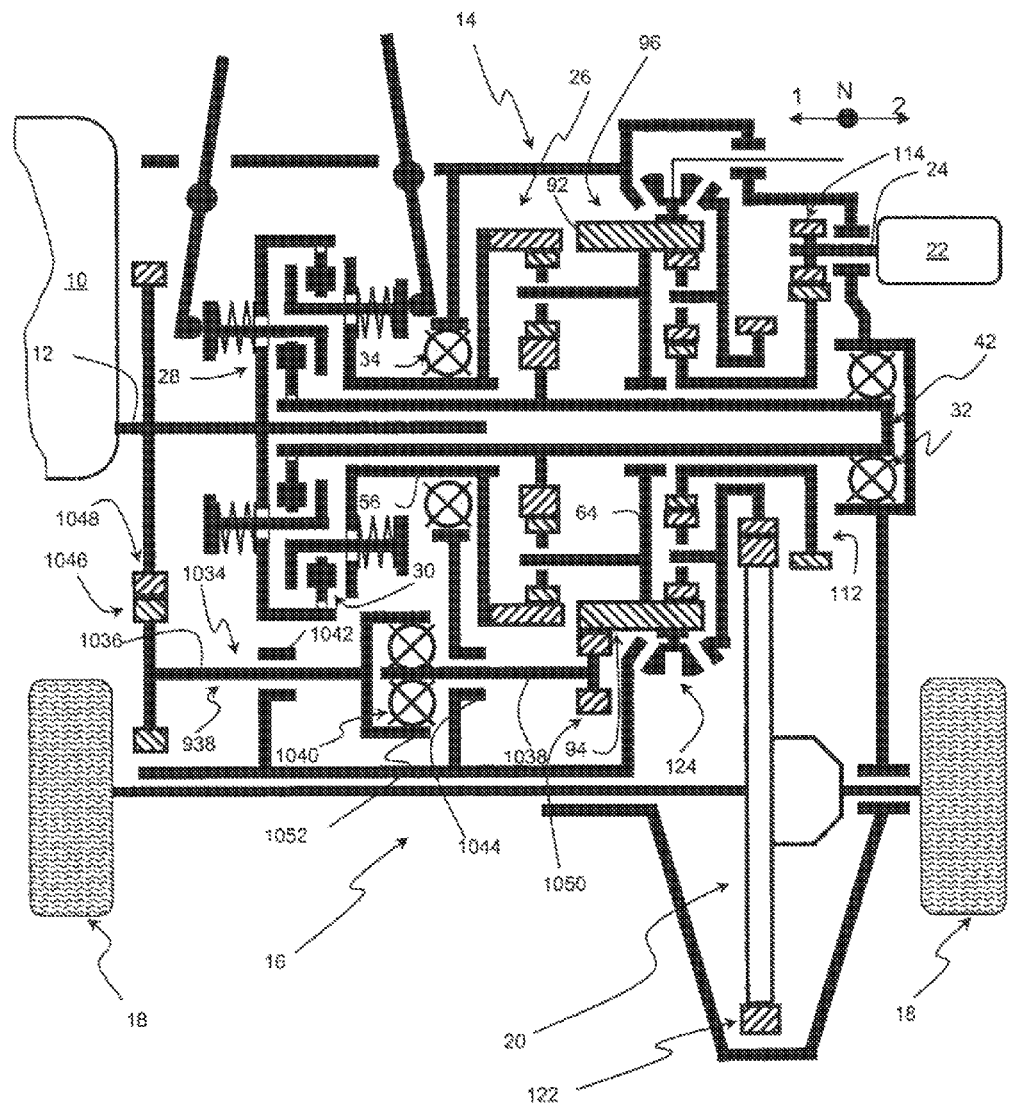

With a view to continuous improvement, the Assignee has further perfected this variable speed transmission device by making it possible for the vehicle to be driven by the thermal engine with an additional fourth gear ratio illustrated in FIG. 9.

By means of this additional gear ratio, the thermal engine is operated at a better working point while having a higher wheel torque.

In FIG. 9, the powertrain comprises thermal engine 10 and a speed variation device 14. This powertrain also comprises an electric machine 22 with a rotor 24.

This powertrain is associated with a drive axle 16 allowing driving wheels 18 of the vehicle advantageously by means of a differential 20.

Speed variation device 14 comprises an engine epicyclic gear train 26, a machine epicyclic gear train 96, two controlled clutches 28 and 30, two automatic one-way couplings, free wheels 32 and 34, and a rotating motion transmission track 938 referred to as speed transmission track.

Engine epicyclic gear train 26 comprises the same elements as those described in connection with FIG. 1.

Machine epicyclic gear train 96 arranged coaxially to engine epicyclic gear train 26 differs from the gear train of FIG. 1 in that strip 92 of crown 94 extends over a greater length on either side of shell 54. This strip also comprises external peripheral teeth.

Rotating motion transmission track 938 of this speed variation device comprises a rotating motion transmission shaft 1034 substantially parallel to engine shaft 12 and to the crown 56 and sun gear 42 shafts. This shaft is advantageously made up of two parts 1036 and 1038 (or half shafts) connected to one another by a one-way coupling 1040 in the form of a free wheel. Each half shaft 1036 and 1038 is carried by a bearing 1042 and 1044 respectively, coming from a fixed portion of the powertrain and free wheel 1040 is arranged between these two bearings.

This shaft carries rotational linking means for connection with shaft 12 and crown 94 of gear train 96. Thus, half shaft 1036 carries, on its end facing engine 10, a toothed wheel 1046 that cooperates with a toothed wheel 1048 carried by shaft 12 and which is arranged between this engine and clutch 28 to form a gear providing rotational linking with shaft 12.

The other half shaft 1038 carries, at its end facing machine 22, a toothed wheel 1050 that cooperates through meshing with the external teeth of strip 92 of crown 94 of machine epicyclic gear train 96, to also form means enabling rotational linking with this crown.

Of course, it is possible to use any other system providing a rotational link, such as notched belts, chains, etc.

As can be better seen in the figure, the free end of one of the two half shafts carries a cage 1052 that houses free wheel 1040, whereas the free end of the other half shaft rests on the inside diameter of this free wheel.

This allows obtaining simultaneous rotation of the two half shafts in a single direction of rotation.

Another gear ratio can be obtained outside epicyclic gear trains 26 and 96 through speed transmission track 938 with clutches 28 and 30 in inactive position and coupling 124 in position N or 2.

The rotating motion of shaft 12 of engine 10 is transmitted to half shaft 1036 by the gear made up of toothed wheels 1048 and 1046. This rotating motion of this half shaft is then transferred to the other half shaft 1038 through free wheel 1040 that is then active so as to drive the other half shaft 1038 in the same direction of rotation. The rotation of this half shaft is transmitted to crown 94 by toothed wheel 1050.

As described above, with this configuration, the path followed by the motion transmission is the same as the path followed from crown 94 to toothed wheels 120 and 112.

This allows achieving another gear ratio without using the engine epicyclic gear train and by bypassing the latter, while using the machine epicyclic gear train.

The invention claimed is:

1. A powertrain for a hybrid type motor vehicle comprising an electric machine, a thermal engine, a speed variation device including an engine epicyclic gear train with a sun gear and a crown which are each connected to an engine shaft of the thermal engine by a controlled clutch and to a fixed portion of the vehicle by a one-way coupling, and a motion transmission track for transmission of motion to a drive axle comprising another epicyclic gear train connecting the engine epicyclic gear train to the motion transmission track.

2. A powertrain for a hybrid type motor vehicle as claimed in claim 1, comprising at least one controlled coupling carried by at least one part of the engine epicyclic gear train.

3. A powertrain for a hybrid type motor vehicle as claimed in claim 1, wherein the engine epicyclic gear train and the another epicyclic gear train are coaxial to one another.

4. A powertrain for a hybrid type motor vehicle as claimed in claim 1, comprising at least one controlled coupling carried by at least one part of the another epicyclic gear train.

5. A powertrain for a hybrid type motor vehicle as claimed in claim 4, wherein the at least one controlled coupling is carried by a crown of the engine epicyclic gear train.

6. A powertrain for a hybrid type motor vehicle as claimed in claim 4, wherein the at least one controlled coupling comprises an actuator and at least one coupling surface for coupling with the actuator.

7. A powertrain for a hybrid type motor vehicle as claimed in claim 6, wherein the at least one coupling surface is carried by a fixed portion of the powertrain.

8. A powertrain for a hybrid type motor vehicle as claimed in claim 6, wherein the at least one coupling surface is carried by a part of the another epicyclic gear train.

9. A powertrain for a hybrid type motor vehicle as claimed in claim 8, wherein the at least one coupling surface is carried by a planet gear carrier of the another epicyclic gear train.

10. A powertrain for a hybrid type motor vehicle as claimed in claim 8, wherein the actuator is carried by a part of the another epicyclic gear train.

11. A powertrain for a hybrid type motor vehicle as claimed in claim 6, wherein the actuator is carried by a crown of the another epicyclic gear train.

12. A powertrain for a hybrid type motor vehicle as claimed in claim 6, wherein the actuator is carried by a sun gear of the another epicyclic gear train.

13. A powertrain for a hybrid type motor vehicle as claimed in claim 1, comprising a rotating motion transmission track parallel to the shaft for connection between the engine shaft and a crown of one of the epicyclic gear trains.

14. A powertrain as claimed in claim 13, wherein the rotating motion transmission track comprises two half shafts connected together by a one-way coupling.

15. A powertrain as claimed in claim 14, wherein the one-way coupling comprises a free wheel.

16. A powertrain as claimed in claim 15, wherein the motion transmission track is parallel to the engine shaft.

17. A powertrain as claimed in claim 15, wherein the motion transmission track is supported by bearings carried by a fixed portion of the powertrain.

18. A powertrain as claimed in claim 14, wherein the motion transmission track is parallel to the engine shaft.

19. A powertrain as claimed in claim 14, wherein the motion transmission track is supported by bearings carried by a fixed portion of the powertrain.

20. A powertrain as claimed in claim 13, wherein the rotating motion transmission track comprises a transmission shaft carrying a rotational link for connection with the engine shaft and the crown.

21. A powertrain as claimed in claim 20, wherein the motion transmission track is supported by bearings carried by a fixed portion of the powertrain.

22. A powertrain as claimed in claim 20, wherein the rotational link for connection with the crown comprises a toothed wheel cooperating with external teeth carried by the crown.

23. A powertrain as claimed in claim 22, wherein the motion transmission track is parallel to the engine shaft.

24. A powertrain as claimed in claim 22, wherein the motion transmission track is supported by bearings carried by a fixed portion of the powertrain.

25. A powertrain as claimed in claim 20, wherein the rotational link for connection with the shaft comprises a gear.

26. A powertrain as claimed in claim 25, wherein the motion transmission track is parallel to the engine shaft.

27. A powertrain as claimed in claim 25, wherein the motion transmission track is supported by bearings carried by a fixed portion of the powertrain.

28. A powertrain as claimed in claim 20, wherein the motion transmission track is parallel to the engine shaft.

29. A powertrain as claimed in claim 28, wherein the motion transmission track is supported by bearings carried by a fixed portion of the powertrain.

30. A powertrain as claimed in claim 20, wherein the rotating motion transmission track comprises two half shafts connected together by a one-way coupling.

31. A powertrain as claimed in claim 30, wherein the motion transmission track is supported by bearings carried by a fixed portion of the powertrain.

32. A powertrain as claimed in claim 30, wherein the motion transmission track is parallel to the engine shaft.

33. A powertrain as claimed in claim 30, wherein the one-way coupling comprises a free wheel.

34. A powertrain as claimed in claim 33, wherein the motion transmission track is parallel to the engine shaft.

35. A powertrain as claimed in claim 33, wherein the motion transmission track is supported by bearings carried by a fixed portion of the powertrain.

* * * * *